US012783308B2

(12) United States Patent
Geist

(10) Patent No.: US 12,783,308 B2
(45) Date of Patent: Nov. 3, 2026

(54) COLLECTIVELY MANAGING SUSPENDED OPERATIONS USING A USER INTERFACE

(71) Applicant: Truist Bank, Charlotte, NC (US)

(72) Inventor: Michael J. Geist, Woodstock, GA (US)

(73) Assignee: Truist Bank, Charlotte, NC (US)

(*) Notice: Subject to any disclaimer, the term of this patent is extended or adjusted under 35 U.S.C. 154(b) by 322 days.

(21) Appl. No.: 18/678,147

(22) Filed: May 30, 2024

(65) Prior Publication Data

US 2025/0370800 A1 Dec. 4, 2025

Related U.S. Application Data

(63) Continuation of application No. 18/678,042, filed on May 30, 2024.

(51) Int. Cl.

*G06F 9/50* (2006.01)
*G06F 3/0482* (2013.01)
*G06F 3/0484* (2022.01)

(52) U.S. Cl.

CPC .......... *G06F 9/5016* (2013.01); *G06F 3/0482* (2013.01); *G06F 3/0484* (2013.01); *G06F 2209/503* (2013.01)

(58) Field of Classification Search

CPC .... G06F 9/5016; G06F 3/0482; G06F 3/0484; G06F 2209/503; G06F 9/466; G06F 9/485; G06F 9/4843

See application file for complete search history.

(56) References Cited

U.S. PATENT DOCUMENTS

| | | | | |
|---|---|---|---|---|
| 2020/0005312 | A1* | 1/2020 | Bull | G08B 13/22 |
| 2021/0103937 | A1* | 4/2021 | Joglekar | G06F 18/22 |
| 2024/0420144 | A1* | 12/2024 | Rozovski | G06Q 20/4016 |

* cited by examiner

*Primary Examiner* — Sisley N Kim

(74) *Attorney, Agent, or Firm* — Nicholas Martin; Greenberg Traurig, LLP; Michael A. Springs

(57) ABSTRACT

A user interface can be used to collectively manage suspended operations. For example, a system can receive a data file that specifies groups of transfer operations to be executed. The system can determine that a subset of the transfer operations is invalid based on a respective attribute of the transfer operations differing from expected values. The system can assign a suspended status to flag each group as suspended operations. The system can transmit a view request to a database system to obtain one or more database views. The system can provide a user interface to an entity to indicate the suspended operations. The system may receive user input provided by the entity that may indicate simultaneous approval to execute the suspended operations. In response, the system can remove the suspended status from the suspended operations. Subsequently, the system can process the data file to execute all of the transfer operations.

20 Claims, 7 Drawing Sheets

| Group 1 202a | 206 Resource Consumption | 204 Resource Allocation | Status | Suspended Operations |
|---|---|---|---|---|
| Operation A 108a | 3 GB | 2 GB | Suspended | 102a Suspended Operation A |
| Operation B 108b | 5 GB | 2 GB | Suspended | 102b Suspended Operation B |
| Operation C 108c | 1 GB | 2 GB | Suspended | 102c Suspended Operation C |

*FIG. 2A*

| Group 2 202b | 208 Originator Identifier | 210 Expected Originator | Status | Suspended Operations |
|---|---|---|---|---|
| Operation D 108d | XYZXYZ | XYZXYZ | Suspended | 102d Suspended Operation D |
| Operation E 108e | ABCABB | ABCABC | Suspended | 102e Suspended Operation E |
| Operation F 108f | XYZXYZ | XYZXYZ | Suspended | 102f Suspended Operation F |

*FIG. 2B*

COLLECTIVELY MANAGING SUSPENDED OPERATIONS USING A USER INTERFACE

CROSS-REFERENCE TO RELATED APPLICATIONS

This application is a continuation of U.S. patent application Ser. No. 18/678,042 filed May 30, 2024, titled "COLLECTIVELY MANAGING SUSPENDED OPERATIONS USING A USER INTERFACE," the entirety of which is incorporated herein by reference.

TECHNICAL FIELD

The present disclosure relates generally to graphical user interfaces and electronic interaction systems and, more particularly (although not necessarily exclusively), collectively managing suspended operations using a user interface.

BACKGROUND

An electronic transfer operation is typically generated based on a transfer request initiated by an originating entity to an originating entity, whereafter the transfer request is processed by the originating entity to perform the electronic transfer operation. Prior to being processed, the transfer request may undergo a validation process executed by the originating entity. If the originating entity is unable to validate the transfer request, the originating entity can suspend the transfer operation associated with the transfer request such that the suspended operation may be deleted or processed at a later time. Resolving the suspended operation associated with the transfer request can involve a manual review to determine an action to perform and a reasoning for the action.

SUMMARY

In one example, a system includes a processor and a memory that includes instructions executable by the processor for causing the processor to perform operations to collectively manage suspended operations using a user interface. The operations can include receiving a data file that specifies one or more groups of transfer operations to be executed. The operations can include, subsequent to receiving the data file, determining that a subset of the transfer operations is invalid based on a respective attribute of the transfer operations differing from one or more expected values. The operations can include, in response to determining that the subset of the transfer operations is invalid, assigning a suspended status to each group of transfer operations specified in the data file to flag the groups of transfer operations as suspended operations. The suspended status can prevent execution of all of the transfer operations in the data file. The operations can include transmitting a view request to a database system to obtain one or more database views associated with the transfer operations specified in the data file. The one or more database views can indicate whether a particular attribute is shared by more than one transfer operation of the transfer operations. The operations can include providing a user interface for display to an entity to indicate the suspended operations. The user interface can be generated based on the one or more database views received from the database system. The operations can include receiving user input provided by the entity via the user interface. The user input can indicate simultaneous approval to execute the suspended operations. The operations can include, in response to receiving the user input, removing the suspended status from the suspended operations. The operations can include, subsequent to removing the suspended status from the suspended operations, processing the data file to execute all of the transfer operations specified in the data file.

In another example, a method to collectively manage suspended operations using a user interface can be implemented. The method can include receiving, by a processor, a data file that specifies one or more groups of transfer operations to be executed. The method can include, subsequent to receiving the data file, determining that a subset of the transfer operations is invalid based on a respective attribute of the transfer operations differing from one or more expected values. The method can include, in response to determining that the subset of the transfer operations is invalid, assigning a suspended status to each group of transfer operations specified in the data file to flag the groups of transfer operations as suspended operations. The suspended status can prevent execution of all of the transfer operations in the data file. The method can include transmitting a view request to a database system to obtain one or more database views associated with the transfer operations specified in the data file. The one or more database views can indicate whether a particular attribute is shared by more than one transfer operation of the transfer operations. The method can include providing a user interface for display to an entity to indicate the suspended operations. The user interface can be generated based on the one or more database views received from the database system. The method can include receiving user input provided by the entity via the user interface. The user input can indicate simultaneous approval to execute the suspended operations. The method can include, in response to receiving the user input, removing the suspended status from the suspended operations. The method can include, subsequent to removing the suspended status from the suspended operations, processing the data file to execute all of the transfer operations specified in the data file.

In yet another example, a non-transitory computer-readable medium can include program code executable by a processor for causing the processor to perform operations to collectively manage suspended operations using a user interface. The operations can include receiving a data file that specifies one or more groups of transfer operations to be executed. The operations can include, subsequent to receiving the data file, determining that a subset of the transfer operations is invalid based on a respective attribute of the transfer operations differing from one or more expected values. The operations can include, in response to determining that the subset of the transfer operations is invalid, assigning a suspended status to each group of transfer operations specified in the data file to flag the groups of transfer operations as suspended operations. The suspended status can prevent execution of all of the transfer operations in the data file. The operations can include transmitting a view request to a database system to obtain one or more database views associated with the transfer operations specified in the data file. The one or more database views can indicate whether a particular attribute is shared by more than one transfer operation of the transfer operations. The operations can include providing a user interface for display to an entity to indicate the suspended operations. The user interface can be generated based on the one or more database views received from the database system. The operations include receiving user input provided by the entity via the user interface. The user input can indicate simultaneous approval to execute the suspended operations. The operations can include, in response to receiving the user input, removing the suspended status from the suspended operations. The operations can include, subsequent to removing the suspended status from the suspended operations, processing the data file to execute all of the transfer operations specified in the data file.

BRIEF DESCRIPTION OF THE DRAWINGS

FIGS. 2A and 2B show examples of suspended operations associated with transfer operations specified in data files according to some aspects of the present disclosure.

DETAILED DESCRIPTION

Figure 1:
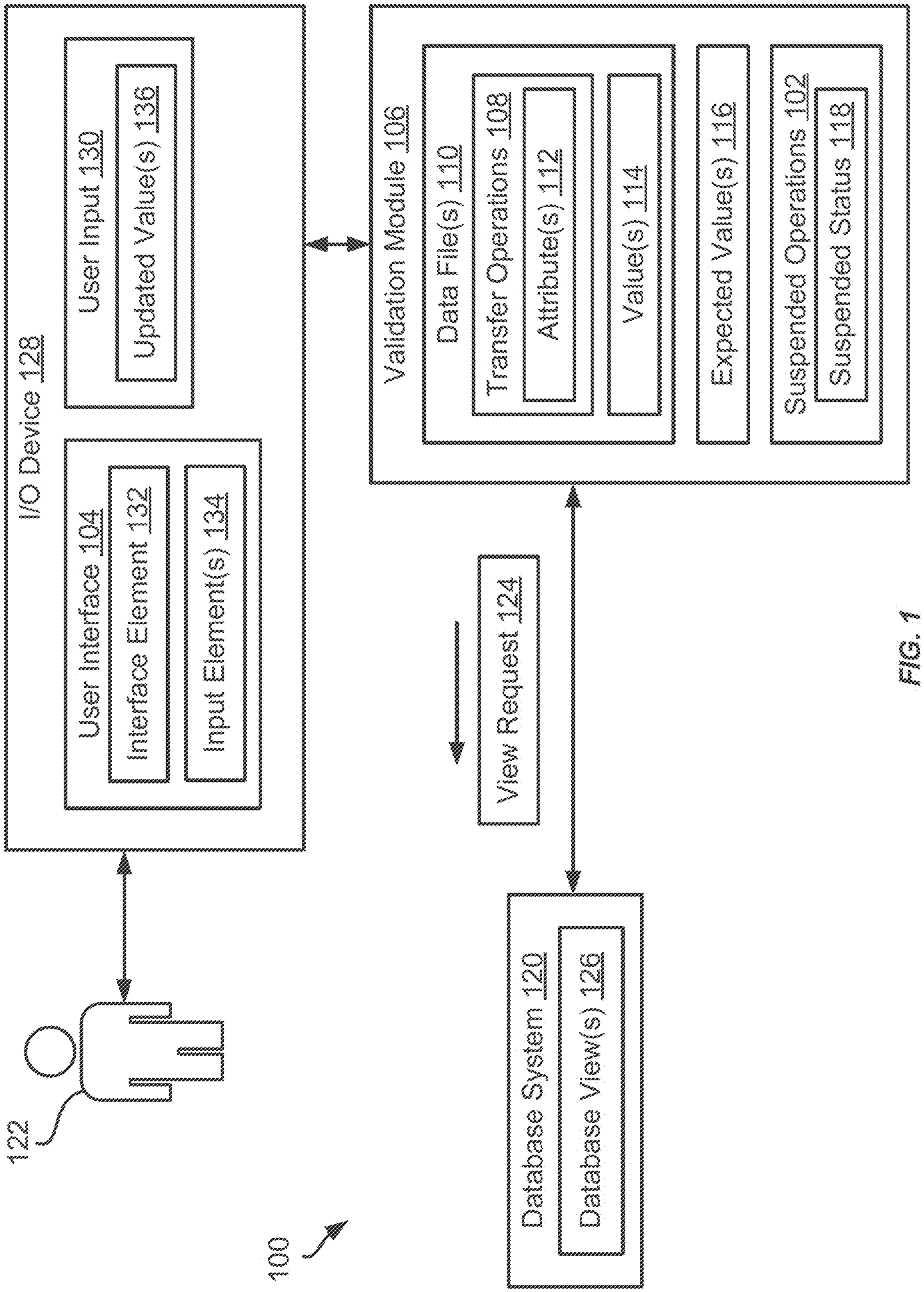
FIG. 1 shows a block diagram of an example of a computing environment for collectively managing suspended operations using a user interface according to some aspects of the present disclosure.

Certain aspects and examples of the present disclosure relate to collectively managing suspended operations using a user interface. The user interface can include an interface element that can be selected by an entity to simultaneously approve an execution of the suspended operations. Based on a selection of the interface element, a computing system associated with the user interface can remove a suspended status from the suspended operations, enabling transfer operations associated with the suspended operations to be executed.

In a typical scenario, managing the suspended operations can be inefficient and time-consuming due to human intervention needed to manually perform data entry related to the suspended operations and to manually resolve the suspended operations. For instance, manual data entry may be implemented to aggregate data related to the suspended operations from different sources. To further complicate the management of the suspended operations, each transfer operation or each group of transfer operations may be assigned the suspended status based on more than one attribute causing the transfer operation(s) to be suspended. In some cases, a portion of a group of transfer operations may lack validation, causing the entire group of transfer operations to be suspended. Resolving the suspended operations can involve providing updated information to resolve each attribute resulting in the suspension of the transfer operations.

Some examples described herein can address one or more of the abovementioned problems using a user interface to collectively manage the suspended operations. The computing system can automatically collect and maintain data associated with the suspended operations to avoid manual data entry. For instance, the computing system can be communicatively coupled with a database system to access data stored in the database system. In particular, the database system may provide aggregated data related to the suspended operations with the aggregated data originating from different sources. Additionally, the computing system can provide a centralized platform via the user interface to enable one or more entities to manage the suspended operations, for example by collectively resolving or by collectively denying the suspended operations. In particular, the user interface may include at least one interface element that the entities can select to collectively manage the suspended operations.

The computing system may assign a suspended status to one or more operations, and thereby generate the suspended operations, based on one or more attributes that have a discrepancy detected by the computing system. To resolve the suspended operations, the entities can provide user input to address the discrepancy, such as by providing updated values or by adjusting expected values. In some cases, the user interface can allow the entities to filter the suspended operations based on a particular attribute. Each entity may have different privileges or authorization to resolve the suspended operations. Accordingly, by filtering the suspended operations based on a particular attribute, each entity can resolve a respective subset of the suspended operations that is relevant to the different privileges or authorization of each entity.

The above illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 to collectively manage suspended operations 102 using a user interface 104 according to some aspects of the present disclosure. In some examples, components within the computing environment 100 may be part of a single computing device, such as a desktop computer, a laptop computer, a server, or a mobile device. In other examples, the components within the computing environment 100 can be positioned in separate locations or separate devices that are communicatively coupled, such as via a network (e.g., the Internet).

As depicted in FIG. 1, the computing environment 100 can include a validation module 106 to validate one or more transfer operations 108 indicated in one or more data files 110. The transfer operations 108 can be operations in which a quantity of resources is transferred from one entity to another entity. In some cases, the data files 110 can have a fixed-width ASCII format. For instance, each line in the data files 110 may have a predefined length, such as 94 characters. Each data file 110 can specify one or more groups of the transfer operations 108. The groups of the transfer operations 108 can be formed based on a shared attribute that each transfer operation 108 in a particular group has in common. Attributes 112 of the transfer operations 108 are described further below with respect to validating the transfer operations 108.

In some examples, the validation module 106 may validate the transfer operations 108 by comparing one or more values 114 of the transfer operations 108 specified in the data files 110 with one or more expected values 116. In other words, the validation module 106 can obtain the values 114 from the data files 110 to determine whether the transfer operations 108 are authorized to be executed. In some cases, the values 114 used to validate the transfer operations 108 can correspond to the attributes 112 of the transfer operations 108. If the values 114 associated with the transfer operations 108 are different from the expected values 116, the validation module 106 can determine that the transfer operations 108 are invalid and can suspend the transfer operations 108. On the other hand, if the values 114 match the expected values 116, the validation module 106 can allow the transfer operations 108 to be executed, such as by forwarding the transfer operations to a processing server to be processed. In some cases, the expected values 116 may define a range within which the values 114 are valid, enabling the transfer operations 108 to be performed. In other cases, the expected values 116 may correspond to a threshold above or below which the values 114 are invalid.

In some implementations, the validation module 106 may validate the transfer operations 108 based on the attributes 112 of the transfer operations 108. Examples of the attributes 112 can correspond to an insufficient amount of system resources, a resource consumption exceeding a predefined threshold, or a lack of validation with respect to an originator of the data files 110. For example, the validation module 106 can compare a respective resource consumption of each transfer operation 108 with a resource allocation as the expected value 116. Based on whether the respective resource consumption of the transfer operations 108 is above the resource allocation, the validation module 106 can determine whether the transfer operations 108 are invalid. In some cases, the resource allocation can correspond to an allocation of unowned resources. For instance, the resource allocation may correspond to a quantity of resources temporarily allocated (e.g., loaned) to the originator of the transfer operations 108. In other words, the originator may not assume ownership of the resources allocated to the originator when the resource allocation is an allocation.

As another example, the validation module 106 can determine that executing a particular transfer operation would result in the resource consumption of an originator associated with the particular transfer operation exceeding an allocation of system resources. Accordingly, the validation module 106 can assign a suspended status 118 to the particular transfer operation to prevent the particular transfer operation from being executed. In some cases, the validation module 106 can assign the suspended status 118 to a group of the transfer operations 108 that the particular transfer operation is part of such that the entire group of the transfer operations 108 is suspended. The group of the transfer operations 108 can correspond to transfer operations 108 that are in the same data file 110. For instance, even if only a single transfer operation in the data file 110 is invalid, the transfer operations 108 in the entire data file 110 can be assigned the suspended status 118. Assigning the suspended status 118 to the transfer operations 108 can generate the suspended operations 102. The attributes 112 of the transfer operations 108 are described further below with respect to FIGS. 2A and 2B.

In some examples, the validation module 106 can request information from a database system 120 communicatively coupled to the validation module 106. For example, the validation module 106 may repeatedly transmit requests to the database system 120 for information associated with the suspended operations 102. In some instances, these transmissions may be repeated periodically at predefined time intervals (e.g., every 10 minutes, every hour, etc.). In some cases, the validation module 106 may use the information from the database system 120 to update the user interface 104, which an entity 122 can interact with to resolve the suspended operations 102. The entity 122 can be referred to as a resolver. For example, to determine whether a particular attribute is shared by more than one transfer operation 108, the validation module 106 can transmit a view request 124 to the database system 120 to obtain one or more database views 126. The database views 126 can indicate whether each attribute associated with the suspended operations 102 is shared by more than one suspended operation 102. Based on the database views 126, the validation module 106 can update the user interface 104 to provide an indication that the particular attribute is associated with more than one suspended operation 102. Based on the particular attribute being associated with more than one suspended operation 102, the suspended operations that share the particular attribute can be assigned to the same group such that the entity 122 can collectively resolve the suspended operations.

As depicted in FIG. 1, the validation module 106 additionally can be communicatively coupled to an input/output (I/O) device 128 that can output the user interface 104 for display to the entity 122 to indicate the suspended operations 102. Additionally, the I/O device 128 can receive user input 130 to resolve the suspended operations 102. The entity 122 may resolve the suspended operations 102 by providing the user input 130 to remove the suspended status 118 of the suspended operations 102 or to deny the suspended operations 102. Removing the suspended status 118 of the suspended operations 102 can correspond to the entity 122 approving an execution of the suspended operations 102. Conversely, denying the suspended operations 102 can cause the transfer operations 108 associated with the suspended operations 102 to be rejected. In some implementations, denying the suspended operations 102 may additionally result in determining whether the transfer operations 108 associated with the denied suspended operations correspond to fraudulent activity, such as identity theft, card skimming, etc.

In some cases, the user interface 104 can include at least one interface element 132 that the entity 122 can select to simultaneously resolve some or all of the suspended operations 102 in bulk. For instance, a subset of the suspended operations 102 may have been suspended due to invalid values for the same attribute 112. In some such scenarios, the entity 122 can interact with the user interface 104 to input a valid value for that attribute 112, which can then be automatically applied to all of the subset of suspended operations 102, thereby allowing the entity 122 to collectively address the reason for the subset of suspended operations 102 in a single step.

In some examples, the user interface 104 can include a series of prompts or user interface pages for allowing the entity 122 to resolve suspended operations 102. For example, the entity 122 can select the interface element 132, which can cause the user interface 104 to display one or more additional input elements through which the entity 122 can provide one or more updated values 136 as the user input 130. Examples of the input elements 134 can include text boxes, dropdown lists, date pickers, other suitable interface elements, or a combination of these. Additionally or alternatively, the user input 130 provided by the entity 122 can include documentation or other suitable explanatory information to support how the entity 122 resolved the suspended operations 102 (e.g., by validating or by denying).

In some examples, the validation module 106 can assign the subset of the suspended operations 102 to be resolved by the entity 122 based on an attribute 112 shared by the subset of the suspended operations 102. How the suspended status 118 of the suspended operations 102 is resolved by the entity 122 can differ depending on the attribute(s) 112 causing the suspended status 118. In particular, the entity 122 may have certain authorization or privileges associated with the attribute 112 such that the entity 122 can provide the user input 130 to resolve the subset of the suspended operations 102. As an example, the suspended status 118 of the subset of the suspended operations 102 may correspond to a resource consumption exceeding a predefined threshold. Accordingly, executing the transfer operations 108 associated with the subset of the suspended operations 102 may cause the resource consumption to exceed the predefined threshold. To resolve the suspended status 118, the entity 122 can remove the suspended status 118 based on the entity 122 having privileges to increase the predefined threshold associated with the resource consumption used to execute the transfer operations 108. In some examples, the validation module 106 may assign individual suspended operations of the subset of the suspended operations 102 to different entities to resolve the suspended status 118 based on a respective authorization of the different entities.

Based on the user input 130 received from the I/O device 128, the validation module 106 can re-evaluate the suspended status 118 of the suspended operations 102, such as by comparing the updated values 136 to the expected values 116. For example, if the updated values 136 match the expected values 116, the validation module 106 can remove the suspended status 118 of the suspended operations 102 such that the transfer operations 108 can be executed. On the other hand, if the updated values 136 are different from the expected values 116, the validation module 106 can maintain the suspended status 118 of the suspended operations 102 and, in some cases, the process may repeat. For example, the entity 122 (e.g., user) may be requested to input a different value for the attribute and try again.

Although FIG. 1 depicts a certain number and arrangement of components, this is for illustrative purposes and is intended to be non-limiting. Other examples may include more components, fewer components, different components, or a different arrangement of the components shown in FIG. 1. For example, a respective I/O device may provide a respective version of the user interface 104 to a respective entity that can use the user interface 104 to collectively manage a respective subset of the suspended operations 102 corresponding to each entity.

FIGS. 2A and 2B show examples of suspended operations 102 associated with transfer operations 108 specified in data files 110 according to some aspects of the present disclosure. In some cases, information provided in FIGS. 2A and 2B can be stored in a database system accessible by a validation module, such as the database system 120 and validation module 106 of FIG. 1. Although FIGS. 2A and 2B are formatted as data tables, it will be appreciated that other suitable formats for presenting data are possible. Certain aspects of FIGS. 2A and 2B are described below with respect to components of FIG. 1.

As depicted in FIG. 2A, a first group 202*a* of transfer operations 108 includes three transfer operations 108*a-c* that have a resource allocation 204 specified as an expected value 116 with respect to which the transfer operations 108*a-c* are validated. Although FIG. 2A shows the same resource allocation of 2 GB for each of the transfer operations 108, it will be appreciated that the resource allocation 204 may differ for a subset of the transfer operations 108 in the same group. In some cases, the first group 202*a* of transfer operations 108*a-c* can be provided in a single data file 110. Due to formatting of the data file 110, the first group 202*a* of transfer operations 108*a-c* can be batched together such that the transfer operations 108*a-c* are collectively assigned a suspended status 118 if there is a discrepancy associated with the transfer operations 108*a-c*. For instance, the formatting of the data file 110 may capture certain data elements at different levels within the formatting. The data elements indicated in the formatting of the data file 110 can correspond to a file-level data elements, group-level data elements, or operation-level data elements associated with the transfer operations 108. In financial or banking applications, the data file 110 can provide a respective hash total (e.g., a checksum) as a group-level data element to ensure validity of each group in the data file 110. Accordingly, the transfer operations 108 in each group of the data file 110 can be collectively adjusted rather than being adjusted as individual transfer operations to ensure that the respective hash total can be used to validate each group of the data file 110.

In some examples, the validation module 106 of FIG. 1 can compare a respective resource consumption 206 of the transfer operations 108*a-c* to the resource allocation 204 to determine whether to assign the suspended status 118 to the transfer operations 108*a-c*. For example, for a first transfer operation 108*a*, Operation A, the validation module 106 can determine that the first transfer operation 108*a* is invalid due to the resource consumption 206 of 3 GB being greater than the resource allocation 204 of 2 GB. Accordingly, the validation module 106 can suspend the first transfer operation 108*a* by assigning a suspended status 118 to the first transfer operation 108*a* to generate a first suspended operation 102*a*. Suspending the first transfer operation 108*a* can prevent the first transfer operation 108*a* from being executed until the suspended status 118 is removed.

Similarly, the validation module 106 can assign a suspended status 118 to a second transfer operation 108*b*, Operation B, based on the resource consumption 206 associated with the second transfer operation 108*b* being higher than the resource allocation 204. For a third transfer operation 108*c* in the first group 202*a*, the validation module 106 can determine that the resource consumption 206 is less than the resource allocation 204 such that the third transfer operation 108*c* can be validated. Due to the first group 202*a* having transfer operations 108*a-b* that are suspended, the validation module 106 may flag all of the transfer operations 108*a-c* in the first group 202*a* using the suspended status 118. In other words, the third transfer operation 108*c* can be suspended by the validation module 106 even though the resource consumption 206 of the third transfer operation 108*c* is valid due to the resource consumption 206 being below the resource allocation 204.

As depicted in FIG. 2B, a second group 202*b* of transfer operations 108*d-f* can be suspended based on an originator identifier 208 of the transfer operations 108*d-f* being different from an expected value 116 corresponding to an expected originator 210. The expected originator 210 can refer to an originating entity that initiated the transfer operations 108. In some implementations, the originator identifier 208 can correspond to a sequence of characters that is associated with an entity. Examples of the originator identifier 208 may include personal identifiable information (PII), such as name, residential address, identifying numbers, email address, etc. In some cases, the originator identifier 208 being different from the expected originator

210 can indicate fraudulent activity, such as identify fraud or unauthorized transfer operations.

Similar to FIG. 2A, the validation module 106 may collectively flag the transfer operations 108*d-f* in the second group 202*b* due to the second group 202*b* including at least one transfer operation that is invalid. For example, as depicted in FIG. 2B, a fourth transfer operation 108*d* (e.g., Operation D) and a sixth transfer operation 108*f* (e.g., Operation F) can have an originator identifier 208 that matches the expected originator 210. Conversely, a fifth transfer operation 108*e* (e.g., Operation E) can have an originator identifier 208 that is different from the expected originator 210. As a result of this discrepancy, the validation module 106 can suspend each transfer operation 108*d-f* f in the second group 202*b* to prevent the transfer operations 108*d-f* from being performed. Accordingly, FIG. 2B includes suspended operations 102*d-f* corresponding to the transfer operations 108*d-f* of the second group 202*b* that have been suspended. Although FIGS. 2A and 2B depict the suspended status 118 assigned to individual transfer operations 108*a-f*, it will be appreciated that the suspended status 118 may be assigned to an overall group of transfer operations (e.g., the first group 202*a* or the second group 202*b*).

In some examples, after the validation module 103 receives one or more updated values 136 from an entity 122 to resolve the suspended status 118 of the transfer operations 108*a-f*, the validation module 106 can remove the suspended status 118. For example, if the validation module 106 can validate the transfer operations 108*a-f* using the updated values 136, the validation module 106 can remove the suspended status 118 from the suspended operations 102. In particular, the validation module 106 can collectively remove the suspended status 118 from all of the transfer operations 108*a-f* if the updated values 136 resolve the discrepancy with the expected values 116. Once the suspended status 118 is removed by the validation module 106, the transfer operations 108*a-f* can be executed.

In other examples, the updated values 136 may be insufficient to resolve the discrepancy associated with the expected values 116. Consequently, the validation module 106 may deny a subset of the transfer operations 108*a-f* that are invalid. For example, the validation module 106 may deny the first transfer operation 108*a*, the second transfer operation 108*b*, and the fifth transfer operation 108*e* due to the discrepancy with respect to the expected values 116.

Figure 3:
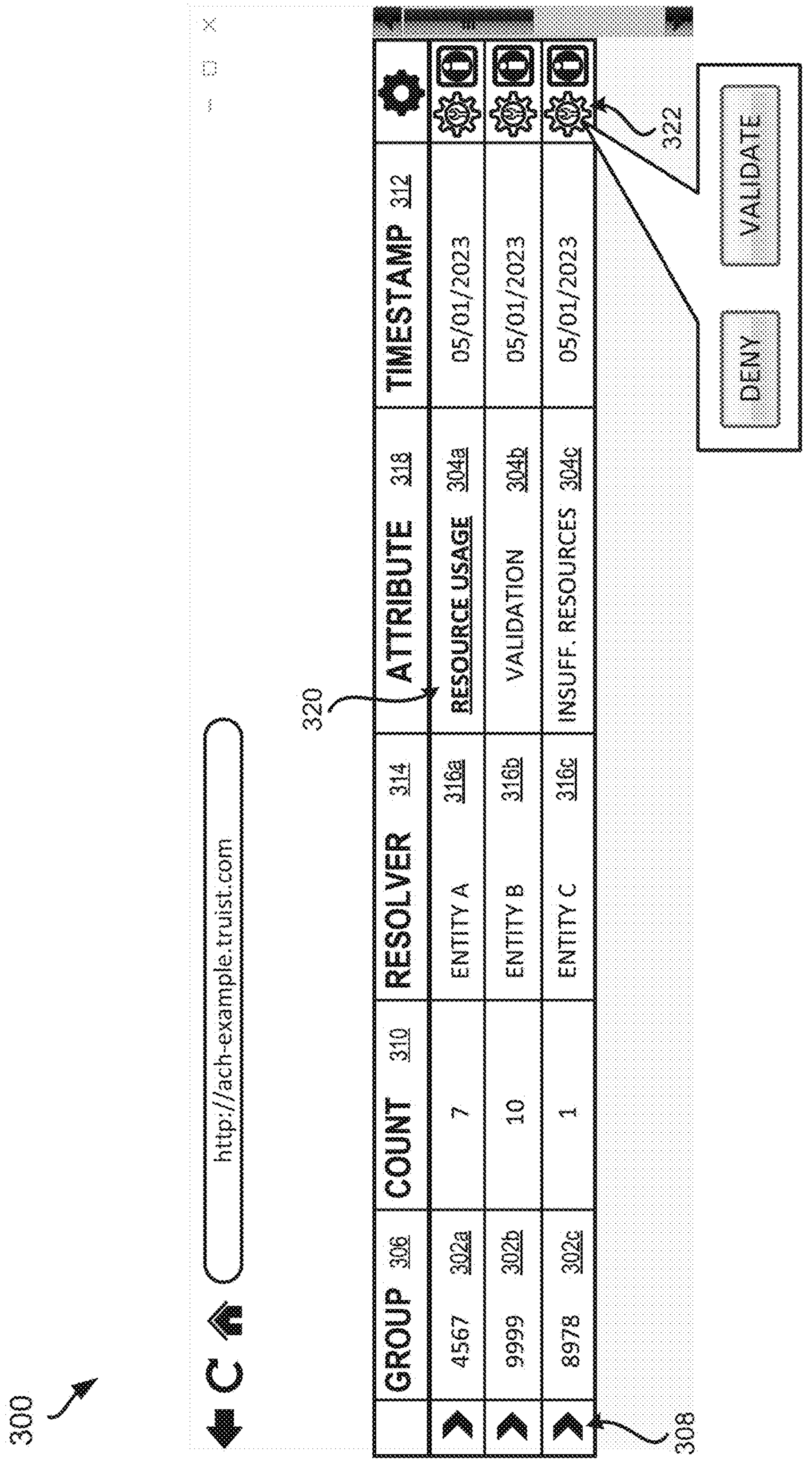
FIG. 3 shows an example of a user interface for allowing an entity to collectively manage suspended operations according to some aspects of the present disclosure.

FIG. 3 shows an example of a user interface 300 for allowing an entity 122 to collectively manage suspended operations 102 according to some aspects of the present disclosure. Although FIG. 3 depicts a web page as the user interface 300, it will be appreciated that other suitable graphical user interfaces are possible. For example, the user interface 300 can be displayed as part of a software application installed on a mobile device. Some aspects of FIG. 3 are described below with reference to components described above in FIGS. 1-2.

As depicted in FIG. 3, the user interface 300 can have a table layout to display information associated with the suspended operations 102. In some implementations, the suspended operations can be sorted into one or more groups 302*a-c*, such as based on a shared attributed 304. For example, the user interface 300 displays a group column 306 listing three groups of the suspended operations 102. In some cases, the user interface 300 can include an accordion interface element 308, such as positioned adjacent to the group column 306, that can be selected by the entity 122 to display individual suspended operations 102 in each group 302. Each group 302 displayed in the user interface 300 can have a respective group identifier that is unique to each group 302. Although the user interface 300 includes four-digit sequences of numbers as the group identifiers, it will be appreciated that other suitable sequences (e.g., an alphanumeric sequence) are possible.

The user interface 300 can include other columns to provide additional information associated with the suspended operations 102. For example, the user interface 300 may include a count column 310 to indicate a respective quantity of suspended operations 102 in each group 302. As another example, the user interface 300 can include a timestamp column 312 to indicate a creation date corresponding to the groups 302*a-c* displayed in the user interface 300. For instance, the creation date can correspond to a date or time at which the suspended operations 102 were assigned the suspended status 118 by the validation module 106.

In some examples, the user interface 300 can include a resolver column 314 to indicate which entity of one or more entities 316*a-c* is assigned to manage a respective group. In some cases, the entity 122 may be selected based on the shared attribute 304 of the suspended operations 102 in each group 302. For instance, the entity 122 may be afforded specific privileges that allow the entity 122 to remove a suspended status 118 of the suspended operations 102 or to deny the suspended operations 102. The shared attribute 304 can be provided in the user interface 300 via an attribute column 318 of the user interface 300.

In some examples, a shared attribute 304 in the attribute column 318 may correspond to a navigation element 320 that can be selected by the entity 122 to display a subset of the suspended operations 102 associated with the shared attribute 304. In some implementations, the navigation element 320 can be a hyperlink. To visually distinguish the navigation element 320 in the user interface 300, the navigation element 320 can include a visual indicator, such as a typographical emphasis, a color indicator, etc. Examples of the typographical emphasis can include bolded text, italicized text, underlined text, or a combination of these. As an example, if the navigation element 320 in the user interface 300 is selected, the user interface 300 can be updated to display at least two suspended operations 102 that share the attribute of resource usage 304*a* causing the suspended status 118. Other examples of the attribute 304 can include validation 304*b* (e.g., with respect to an originating entity) or insufficient system resources 304*c*. In some examples, the user interface 300 may include additional granularity with respect to the shared attribute 304, such as by providing an expected originator as the shared attribute 304 for suspended operations 102 that lack validation 304*b*. Additional details regarding the updated user interface are provided below with respect to FIG. 4.

In some examples, the user interface 300 can allow the entity 122 to collectively resolve at least a subset of the suspended operations 102 using an interface element 322. Selecting the interface element 322 can enable the entity 122 to deny or validate the suspended operations 102 of a particular group displayed in the user interface 300. For example, the user interface 300 can include a respective interface element corresponding to each group 302 such that the entities 316*a-c* can collectively validate the suspended operations 102 in each group 302 assigned to the entities 316*a-c*. As depicted in FIG. 3, selecting the interface element 322 can cause the user interface 300 to output one or more options that the entities 316*a-c* can select to act on the suspended operations 102. For example, if the entities 316*a-c* select an option to validate the suspended operations 102, the user interface 300 may then prompt the entities 316*a-c* to provide user input 130, such as updated values 136, to re-evaluate the suspended operations 102. As another example, the entities 316*a-c* select another option to deny the suspended operations 102, the user interface 300 may prompt the entities 316*a-c* to select a subset of the suspended operations 102 to deny. After being denied, the subset of the suspended operations 102 can be removed from the user interface 300.

Figure 4:
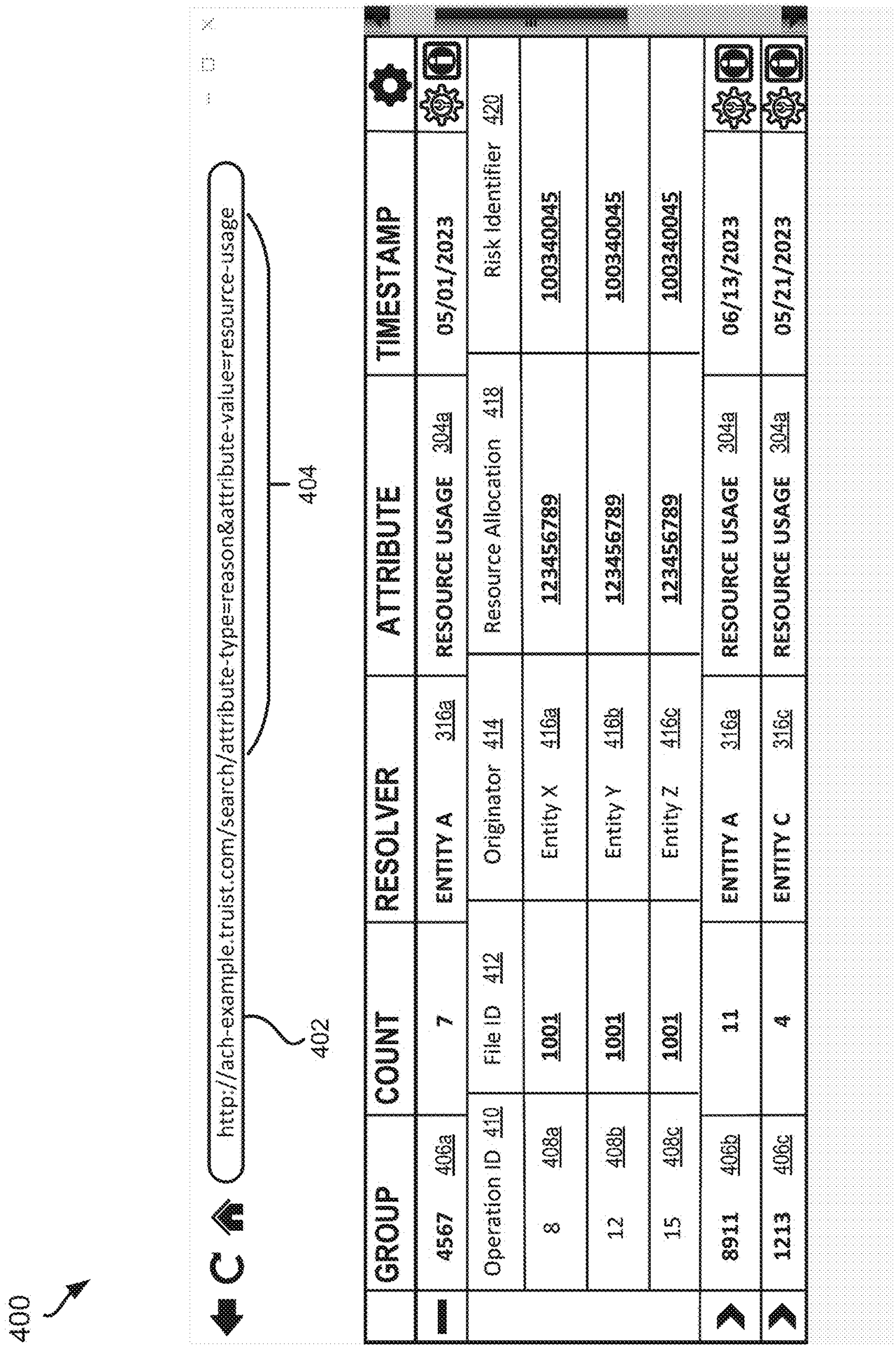
FIG. 4 shows another example of a user interface for allowing an entity to collectively manage suspended operations according to some aspects of the present disclosure.

FIG. 4 is a schematic of another example of a user interface 400 allowing an entity 122 to collectively manage suspended operations 102 according to some aspects of the present disclosure. In particular, the user interface 400 depicts a web page displayed to the entity 122 after the entity 122 selects the navigation element 320 of FIG. 3. The web page can correspond to a resource identifier 402, such as a uniform resource location (URL), that can include a query component 404. In some implementations, the resource identifier 402 can be generated based on the Hypertext Transfer Protocol (HTTP), such as the GET method to retrieve the web page.

As depicted in FIG. 4, the query component 404 of the resource identifier 402 associated with the user interface 400 indicates that the user interface 400 displays groups 406*a-c* of suspended operations 408 that share an attribute 304 related to resource usage. Additionally, the user interface 400 depicts an expanded section corresponding to a group 406*a* of suspended operations 408*a-c* to display additional details corresponding to the suspended operations 408*a-c*. In some cases, the user interface 400 may display the expanded section corresponding to the group 406*a* after detecting user input selecting an accordion interface element corresponding to the group 406*a*. For example, the additional details can include identification information, such as corresponding to the suspended operations 408*a-c* or corresponding to a data file associated with the suspended operations 408*a-c*. In particular, the expanded section of the user interface 400 can include an operation ID column 410, a file ID column 412, or a combination of these to provide the identification information.

In some examples, the additional details of the group 406*a* can relate to the suspended status 118 of the suspended operations 408*a-c*. For instance, the expanded section of the user interface 400 can include an originator column 414 listing a respective originating entity 416*a-c* corresponding to each suspended operation 408*a-c*. Other columns in the expanded section can include a resource allocation column 418 and a risk identifier column 420. The resource allocation column 418 can indicate an amount of system resources allocated to each suspended operation 408*a-c* in the group 406*a*. In some examples, the system resources can correspond to computing resources (e.g., random access memory, storage, central processing unit cores, threads available, etc.). In other examples, the system resources can correspond to financial resources, such as funds. The risk identifier column 420 can display a respective risk identifier corresponding to each suspended operation 408*a-c* in the group 406*a*. In some cases, the risk identifier can indicate a level of risk associated with the originating entity or a transfer operation associated with each suspended operation 408*a-c*.

Figure 5:
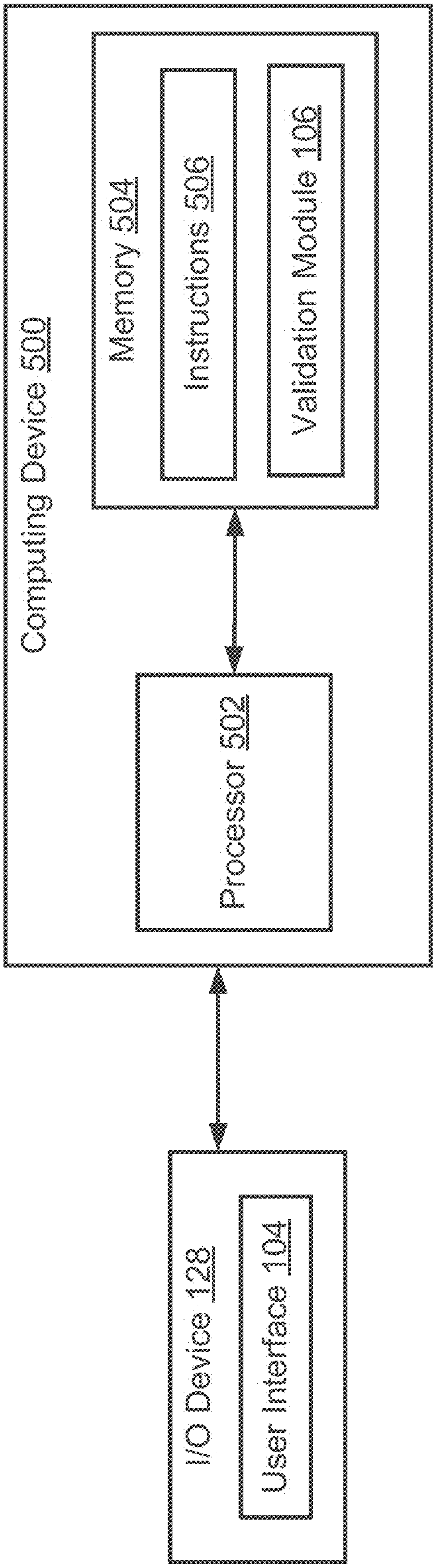
FIG. 5 shows a block diagram of an example of a computing system for collectively managing suspended operations using a user interface according to some aspects of the present disclosure.

FIG. 5 is a block diagram of an example computing device 500 usable for implementing some aspects of the present disclosure. The computing device 500 includes a processor 502 that is communicatively coupled to a memory 504. In some examples, the processor 502 and the memory 504 may be distributed from (e.g., remote to) one another. FIG. 5 is described below with reference to components of FIG. 1 discussed above.

The processor 502 can include one processing device or multiple processing devices. Non-limiting examples of the processor 502 include a Field-Programmable Gate Array (FPGA), an application-specific integrated circuit (ASIC), or a microprocessor. The processor 502 can execute instructions 506 stored in the memory 504 to perform operations. In some examples, the instructions 506 can include processor-specific instructions generated by a compiler or an interpreter from code written in a suitable computer-programming language, such as C, C++, C #, etc.

The memory 504 can include one memory or multiple memories. The memory 504 can be non-volatile and may include any type of memory that retains stored information when powered off. Non-limiting examples of the memory 504 include electrically erasable and programmable read-only memory (EEPROM), flash memory, or any other type of non-volatile memory. At least some of the memory 504 can include a non-transitory, computer-readable medium from which the processor 502 can read instructions 506. A computer-readable medium can include electronic, optical, magnetic, or other storage devices capable of providing the processor 502 with computer-readable instructions or other program codes. Non-limiting examples of a computer-readable medium include magnetic disk(s), memory chip(s), ROM, random-access memory (RAM), an ASIC, a configured processor, optical storage, or any other medium from which a computer processor can read the instructions 506.

In some examples, the processor 502 can execute the instructions 506 to allow an entity 122 to collectively manage suspended operations 102. The processor 502 can receive a data file 110 that specifies transfer operations 108 to be executed. In some examples, the processor 502 may execute the transfer operations 108 after validating the transfer operations 108. The data file 110 can specify one or more groups of transfer operations 108 to be executed. During a validation process of validating the transfer operations 108, the processor 502 may determine that a subset of the transfer operations 108 has one or more values 114 that are invalid. The subset of the transfer operations 108 can include at least one transfer operation from each group of the transfer operations 108 specified in the data file 110. For example, the processor 502 may perform the validation process by comparing the values 114 of the transfer operations 108 and one or more expected values 116. To perform the validation process, the processor 502 may execute a validation module, such as the validation module 106 of FIG. 1. In some cases, the validation process can be referred to as reconciliation.

After determining that the subset of the transfer operations 108 have values that are invalid, the processor 502 can suspend execution of all of the transfer operations 108 in the data files 110. Additionally, the processor 502 can flag the groups of the transfer operations 108 as suspended operations 102 by assigning a suspended status 118 to the groups of the transfer operations 108. The processor 502 can assign the suspended status 118 to each group provided in the data file 110 due to the subset of the transfer operations 108 including at least one transfer operation from each group in the data file 110. In other words, at least one transfer operation from each group in the data file 110 being invalid can cause each group to be assigned the suspended status 118.

To resolve the suspended status 118, the processor 502 can provide a user interface 104 for display to an entity 122.

The user interface 104 can indicate the suspended operations 102 and can allow the entity 122 to approve the execution of the suspended operations 102. In particular, the user interface 104 can include an interface element 132 that the entity 122 can select to simultaneously approve the execution of a subset of the suspended operations 102.

In some examples, the computing device 500 may be communicatively coupled to one or more input/output (I/O) components, such as an I/O device 128. For example, the computing device 500 can include a touchscreen, a mouse, a keyboard, a trackball, a touch pad, a visual display, an audio display, or any combination of these. Examples of the visual display can include a liquid crystal display (LCD), a light-emitting diode (LED) display, or the touch-screen display. An example of the audio display can include speakers. In some cases, the I/O components can be integrated into a single structure with the components of the computing device 500. For example, the I/O device 128 may be positioned within a single housing with the components of the computing device 500. In other examples, the I/O components can be distributed (e.g., in separate housings) and in electrical communication with each other and the computing device 500. For example, the I/O device 128 may be part of a computing device that is separate from the computing device 500.

Figure 6:
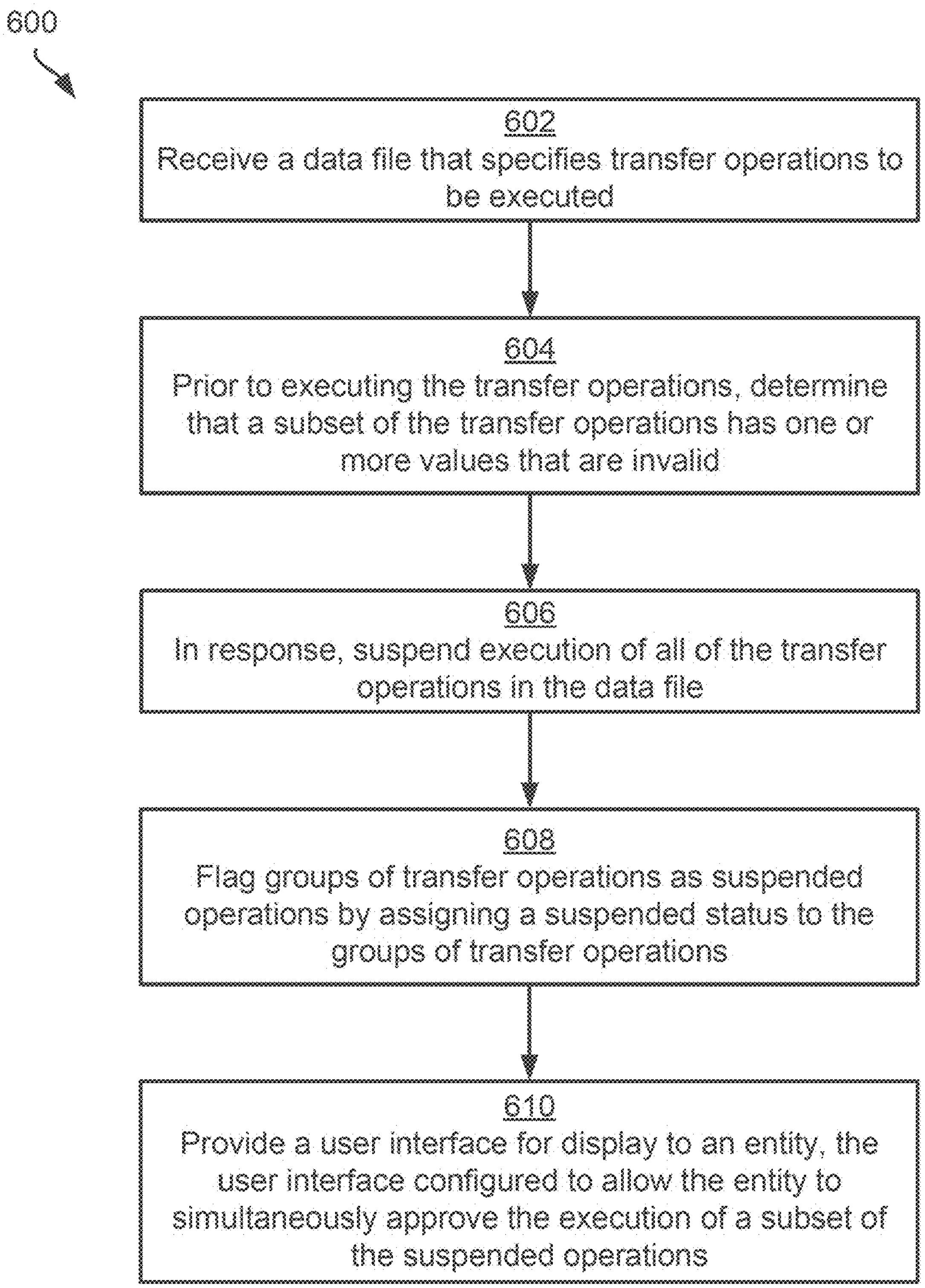
FIG. 6 shows a flow chart of an example of a process for collectively managing suspended operations using a user interface according to some aspects of the present disclosure.

FIG. 6 is a flow chart of an example of a process 600 for collectively managing suspended operations using a user interface according to some aspects of the present disclosure. Other examples can involve more steps, fewer steps, different steps, or a different order of the steps depicted in FIG. 6. The steps of FIG. 6 are described below with reference to components discussed above in FIGS. 1 and 5.

In block 602, the processor 502 receives a data file 110 that specifies transfer operations 108 to be executed. In some examples, the processor 502 may receive the data file 110 after submitting a query to a database system 120. For example, the data file 110 can correspond to an automated clearing house (ACH) file used to implement an electronic transfer of credit transactions or debit transactions. The data file 110 can include one or more groups of the transfer operations 108 that can be grouped based on one or more attributes 112 that are shared. In some examples, the transfer operations 108 can be grouped into the one or more groups based on a time at which the transfer operations 108 were submitted. For example, each transfer operation 108 submitted within a time range of 1:00 PM to 1:05 PM may be assigned to a particular group.

In block 604, prior to executing the transfer operations 108, the processor 502 determines that a subset of the transfer operations 108 has one or more values 114 that are invalid. The processor 502 can validate the transfer operations 108 by verifying whether the values 114 of the transfer operations 108 are consistent with one or more expected values 116. For example, the processor 502 may execute a validation module 106 to verify an identity of one or more originating entities who have initiated the transfer operations 108. Consequently, the processor 502 may detect a discrepancy between the values 114 and the expected values 116 if the values 114 are inconsistent with the expected values 116. Based on detecting the discrepancy, the processor 502 can determine that the subset of the transfer operations 108 is associated with invalid values.

In block 606, in response to determining that the subset of the transfer operations 108 has the values 114 that are invalid, the processor 502 suspends execution of all of the transfer operations 108 in the data file 110. In other words, the processor 502 may suspend all transfer operations in the data file 110, even those that have valid values, if the processor 502 determines that at least one transfer operation in the data file 110 has values that are invalid. For example, if the data file 110 is an ACH file that may include one or more batches with multiple transfer operations, the processor 502 may suspend the entire data file 110 based on detecting a discrepancy associated with at least one transfer operation in the data file 110.

In block 608, the processor 502 flags groups of transfer operations 108 as suspended operations 102 by assigning a suspended status 118 to the groups of transfer operations 108. In some cases, the processor 502 can assign the suspended status 118 using metadata to indicate that the groups of the transfer operations 108 are suspended. The suspended status 118 can prevent the processor 502 from executing any transfer operation in the groups of the transfer operations 108 that are assigned the suspended status 118.

In block 610, the processor 502 provides a user interface 104 for display to an entity 122. The user interface 104 can be configured to allow the entity 122 to simultaneously approve the execution of a subset of the suspended operations 102. For example, the user interface 104 can include an interface element 132 that the entity 122 can select to provide user input 130 to resolve the suspended status 118 of the suspended operations 102. In some cases, the user interface 104 may also allow the entity 122 to simultaneously deny the execution of the subset of the suspended operations 102. For instance, if the entity 122 is unable to validate the transfer operations 108 associated with the subset of the suspended operations 102, the entity 122 may prevent the transfer operations 108 from being executed.

Figure 7:
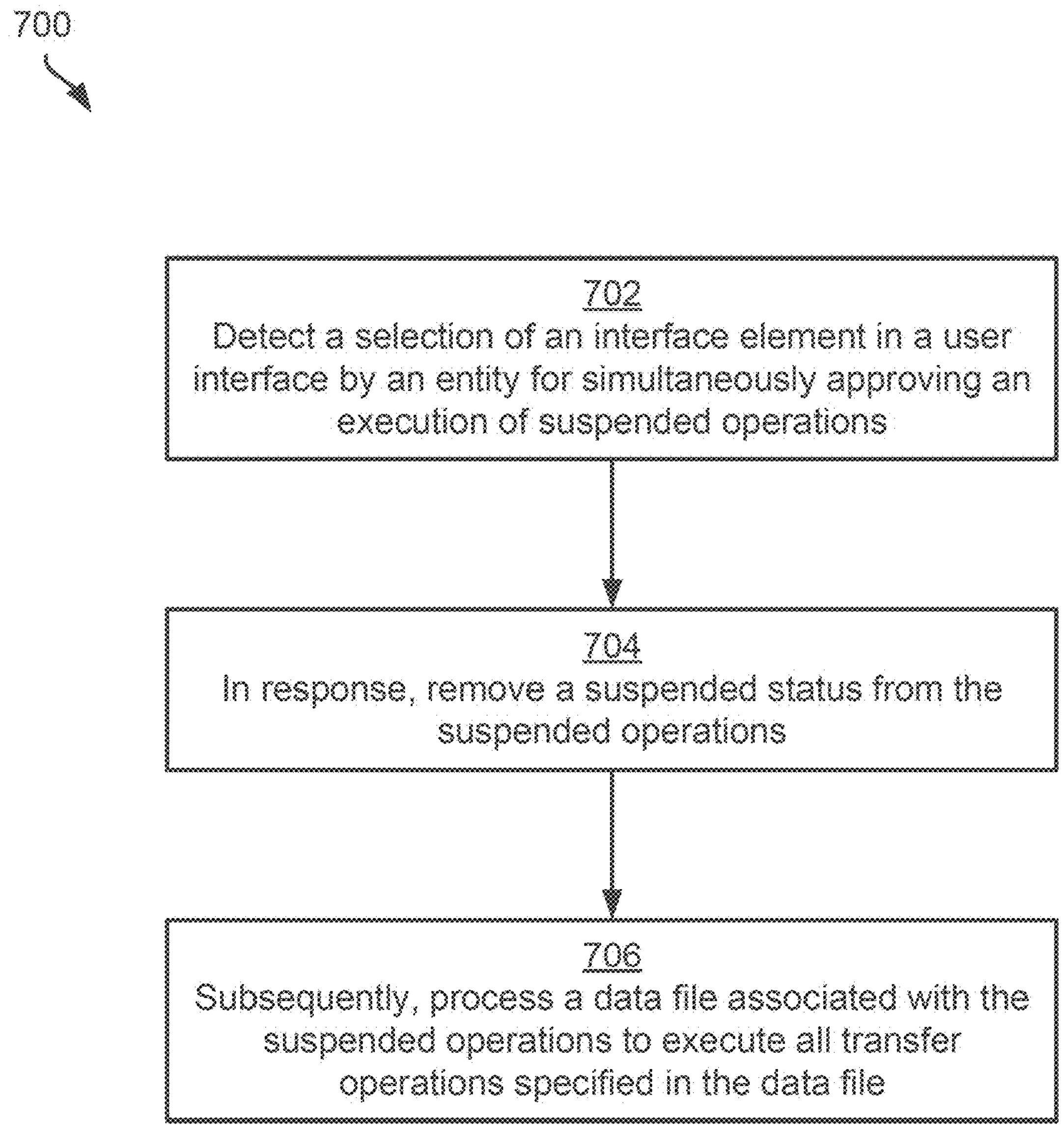
FIG. 7 shows a flow chart of an example of a process for using an interface element of a user interface to simultaneously approve an execution of suspended operations according to some aspects of the present disclosure.

FIG. 7 is a flow chart of an example of a process 700 for using an interface element 132 of a user interface 104 to simultaneously approve an execution of suspended operations 102 according to some aspects of the present disclosure. In some examples, the processor 502 can perform one or more of the steps shown in FIG. 7. In other examples, the processor 502 can implement more steps, fewer steps, different steps, or a different order of the steps depicted in FIG. 7. The steps of FIG. 7 are described below with reference to components discussed above in FIGS. 1 and 5. In some examples, the steps of FIG. 7 can be a continuation from block 610 of process 600 described above with respect to FIG. 6.

In block 702, the processor 502 detects a selection of the interface element 132 in the user interface 104 by an entity 122 for simultaneously approving an execution of the suspended operations 102. The processor 502 may detect the selection of the interface element 132 based on user input 130 provided by the entity 122 via an input device, such as a touchscreen, a mouse, a keyboard, etc. In some cases, the user input 130 may additionally include one or more updated values 136 that the processor 502 can compare with the expected values 116 to validate a subset of transfer operations 108 associated with the suspended operations 102. For instance, the updated values 136 may be provided by the entity 122 to replace or update existing values in a data file 110 associated with the subset of the transfer operations 108.

In block 704, in response to detecting the selection of the interface element 132, the processor 502 removes a suspended status 118 from the suspended operations 102. In some cases, the processor 502 can delete metadata associated with the suspended operations 102 to remove the suspended status 118. By removing the suspended status 118, the processor 502 then can execute the transfer operations 108 associated with the suspended operations 102.

In block 706, subsequent to removing the suspended status 118 from the suspended operations 102, the processor 502 processes the data file 110 associated with the suspended operations 102 to execute all transfer operations 108 associated with the data file 110. For example, executing the transfer operations 108 can involve transferring resources between two entities involved with the transfer operations 108. In some implementations, the processor 502 may process the data file 110 to transmit the data files 110 to a separate server or computing system that can execute the transfer operations 108.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a processor; and a memory including instructions that are executable by the processor for causing the processor to perform operations comprising:

receiving a data file that specifies one or more groups of transfer operations to be executed;

subsequent to receiving the data file, determining that a subset of the transfer operations is invalid based on a respective attribute of the transfer operations differing from one or more expected values;

in response to determining that the subset of the transfer operations is invalid, assigning a suspended status to each group of transfer operations specified in the data file to flag the groups of transfer operations as suspended operations, the suspended status preventing execution of all of the transfer operations in the data file;

transmitting a view request to a database system to obtain one or more database views associated with the transfer operations specified in the data file, the one or more database views indicating whether a particular attribute is shared by more than one transfer operation of the transfer operations;

providing a user interface for display to an entity to indicate the suspended operations, the user interface generated based on the one or more database views received from the database system;

receiving user input provided by the entity via the user interface, the user input indicating simultaneous approval to execute the suspended operations;

in response to receiving the user input, removing the suspended status from the suspended operations; and subsequent to removing the suspended status from the suspended operations, processing the data file to execute all of the transfer operations specified in the data file.

2. The system of claim 1, wherein the operations further comprise, subsequent to transmitting the view request to the database system:

receiving the one or more database views from the database system, the one or more database views indicating whether each attribute of the suspended operations is shared by more than one suspended operation;

determining, based on the one or more database views, a respective assignment of the suspended operations to enable collective resolution of the suspended operations; and generating the user interface to include an indication that a particular attribute is associated with more than one suspended operation.

3. The system of claim 1, wherein the user interface comprises a navigation element corresponding to a particular attribute shared by at least two suspended operations of the suspended operations, and wherein the navigation element is selectable by the entity to display the at least two suspended operations that share the particular attribute associated with the navigation element.

4. The system of claim 1, wherein the operations further comprise, subsequent to assigning the suspended status to each group of transfer operations:

assigning the suspended operations to be resolved by the entity based on a particular attribute shared by the suspended operations, wherein the entity is allowed to resolve the suspended status corresponding to the suspended operations based on the entity having privileges associated with the particular attribute.

5. The system of claim 1, wherein determining that the subset of the transfer operations is invalid further comprises:

comparing a respective resource consumption of each transfer operation specified by the data file with an expected resource allocation, wherein the expected resource allocation is an expected value used to validate the data file; and determining, based on each resource consumption corresponding to the subset of the transfer operations being above the expected resource allocation, that the subset of the transfer operations is invalid.

6. The system of claim 5, wherein the expected resource allocation corresponds to an allocation of unowned resources.

7. The system of claim 1, wherein determining that the subset of the transfer operations is invalid further comprises:

determining whether a respective originator identifier of each transfer operation associated with the data file corresponds to an expected originator, wherein the expected originator is an expected value used to validate the data file; and determining, based on each respective originator identifier being different from the expected originator, that the subset of the transfer operations is invalid.

8. A method comprising:

receiving a data file that specifies one or more groups of transfer operations to be executed;

subsequent to receiving the data file, determining that a subset of the transfer operations is invalid based on a respective attribute of the transfer operations differing from one or more expected values;

in response to determining that the subset of the transfer operations is invalid, assigning a suspended status to each group of transfer operations specified in the data file to flag the groups of transfer operations as suspended operations, the suspended status preventing execution of all of the transfer operations in the data file;

transmitting a view request to a database system to obtain one or more database views associated with the transfer operations specified in the data file, the one or more database views indicating whether a particular attribute is shared by more than one transfer operation of the transfer operations;

providing a user interface for display to an entity to indicate the suspended operations, the user interface generated based on the one or more database views received from the database system;

receiving user input provided by the entity via the user interface, the user input indicating simultaneous approval to execute the suspended operations;

in response to receiving the user input, removing the suspended status from the suspended operations; and subsequent to removing the suspended status from the suspended operations, processing the data file to execute all of the transfer operations specified in the data file.

9. The method of claim 8, further comprising, subsequent to transmitting the view request to the database system:

receiving the one or more database views from the database system, the one or more database views indicating whether each attribute of the suspended operations is shared by more than one suspended operation;

determining, based on the one or more database views, a respective assignment of the suspended operations to enable collective resolution of the suspended operations; and generating the user interface to include an indication that a particular attribute is associated with more than one suspended operation.

10. The method of claim 8, wherein the user interface comprises a navigation element corresponding to a particular attribute shared by at least two suspended operations of the suspended operations, and wherein the navigation element is selectable by the entity to display the at least two suspended operations that share the particular attribute associated with the navigation element.

11. The method of claim 8, further comprising, subsequent to assigning the suspended status to each group of transfer operations:

assigning the suspended operations to be resolved by the entity based on a particular attribute shared by the suspended operations, wherein the entity is allowed to resolve the suspended status corresponding to the suspended operations based on the entity having privileges associated with the particular attribute.

12. The method of claim 8, wherein determining that the subset of the transfer operations is invalid further comprises:

comparing a respective resource consumption of each transfer operation specified by the data file with an expected resource allocation, wherein the expected resource allocation is an expected value used to validate the data file; and determining, based on each resource consumption corresponding to the subset of the transfer operations being above the expected resource allocation, that the subset of the transfer operations is invalid.

13. The method of claim 12, wherein the expected resource allocation corresponds to an allocation of unowned resources.

14. The method of claim 8, wherein determining that the subset of the transfer operations is invalid further comprises:

determining whether a respective originator identifier of each transfer operation associated with the data file corresponds to an expected originator, wherein the expected originator is an expected value used to validate the data file; and determining, based on each respective originator identifier being different from the expected originator, that the subset of the transfer operations is invalid.

15. A non-transitory computer-readable medium comprising program code executable by a processor for causing the processor to perform operations comprising:

receiving a data file that specifies one or more groups of transfer operations to be executed;

subsequent to receiving the data file, determining that a subset of the transfer operations is invalid based on a respective attribute of the transfer operations differing from one or more expected values;

in response to determining that the subset of the transfer operations is invalid, assigning a suspended status to each group of transfer operations specified in the data file to flag the groups of transfer operations as suspended operations, the suspended status preventing execution of all of the transfer operations in the data file;

transmitting a view request to a database system to obtain one or more database views associated with the transfer operations specified in the data file, the one or more database views indicating whether a particular attribute is shared by more than one transfer operation of the transfer operations;

providing a user interface for display to an entity to indicate the suspended operations, the user interface generated based on the one or more database views received from the database system;

receiving user input provided by the entity via the user interface, the user input indicating simultaneous approval to execute the suspended operations;

in response to receiving the user input, removing the suspended status from the suspended operations; and subsequent to removing the suspended status from the suspended operations, processing the data file to execute all of the transfer operations specified in the data file.

16. The non-transitory computer-readable medium of claim 15, wherein the operations further comprise, subsequent to transmitting the view request to the database system:

receiving the one or more database views from the database system, the one or more database views indicating whether each attribute of the suspended operations is shared by more than one suspended operation;

determining, based on the one or more database views, a respective assignment of the suspended operations to enable collective resolution of the suspended operations; and generating the user interface to include an indication that a particular attribute is associated with more than one suspended operation.

17. The non-transitory computer-readable medium of claim 15, wherein the user interface comprises a navigation element corresponding to a particular attribute shared by at least two suspended operations of the suspended operations, and wherein the navigation element is selectable by the entity to display the at least two suspended operations that share the particular attribute associated with the navigation element.

18. The non-transitory computer-readable medium of claim 15, wherein the operations further comprise, subsequent to assigning the suspended status to each group of transfer operations:

assigning the suspended operations to be resolved by the entity based on a particular attribute shared by the suspended operations, wherein the entity is allowed to resolve the suspended status corresponding to the suspended operations based on the entity having privileges associated with the particular attribute.

19. The non-transitory computer-readable medium of claim 15, wherein determining that the subset of the transfer operations is invalid further comprises:

comparing a respective resource consumption of each transfer operation specified by the data file with an expected resource allocation, wherein the expected resource allocation is an expected value used to validate the data file; and determining, based on each resource consumption corresponding to the subset of the transfer operations being above the expected resource allocation, that the subset of the transfer operations is invalid.

20. The non-transitory computer-readable medium of claim 15, wherein determining that the subset of the transfer operations is invalid further comprises:

determining whether a respective originator identifier of each transfer operation associated with the data file corresponds to an expected originator, wherein the expected originator is an expected value used to validate the data file; and determining, based on each respective originator identifier being different from the expected originator, that the subset of the transfer operations is invalid.

* * * * *